United States Patent

Bauer, II

[15] 3,692,394
[45] Sept. 19, 1972

[54] MOTION PICTURE CAMERA MOTOR CONTROL

[72] Inventor: George W. Bauer, II, Westfield, N.J.
[73] Assignee: Anton Bauer, Inc., Norwalk, Conn.
[22] Filed: Dec. 14, 1970
[21] Appl. No.: 97,545

[52] U.S. Cl. .................. 352/176, 352/164, 352/180
[51] Int. Cl. ............................................. G03b 1/42
[58] Field of Search......352/164, 165, 167, 169, 176, 352/177, 180, 182, 208, 212; 318/313, 314, 318, 464, 480

[56] References Cited

UNITED STATES PATENTS

| | | | |
|---|---|---|---|
| 3,565,521 | 2/1971 | Butler | 352/180 X |
| 3,326,626 | 6/1967 | Floden | 352/169 |
| 3,236,581 | 2/1966 | Mitchell | 352/210 X |
| 3,005,940 | 10/1961 | Johnson | 318/313 X |
| 3,154,730 | 10/1964 | Houldin | 318/313 X |
| 3,514,679 | 5/1970 | Larsen | 318/313 X |

*Primary Examiner*—Samuel S. Matthews
*Assistant Examiner*—Monroe H. Hayes
*Attorney*—Curtis, Morris & Safford

[57] ABSTRACT

A motion picture camera with a rotary shutter which, as it rotates, periodically permits an image from the camera lens to reach the film, and then reflects the image to the eyepiece, etc. Motor controls are provided for controlling the speed of the shutter so that the shutter automatically stops at a location in which it blocks and reflects images to the eyepiece rather than one in which images are permitted to reach the film. A pulse generator operates synchronously with the rotary shutter. During stopping of the shutter, whenever the speed of the shutter is insufficient to bring it to a stop at the desired location, the pulse generator produces electrical pulses whose energy would decrease as the position of the shutter changes, but for the decrease in speed of the shutter, and these pulses are fed to the shutter drive motor to control its speed at a level sufficient to bring it to the desired location. Preferably, the pulse generator includes a transparent disc with opaque lines spaced around it, together with an infrared light source and a phototransistor. The spacing between adjacent opaque lines gradually decreases at successive positions around the disc, and a relatively large opaque area is provided on the disc in the vicinity of the position in which the shutter is to be stopped.

14 Claims, 4 Drawing Figures

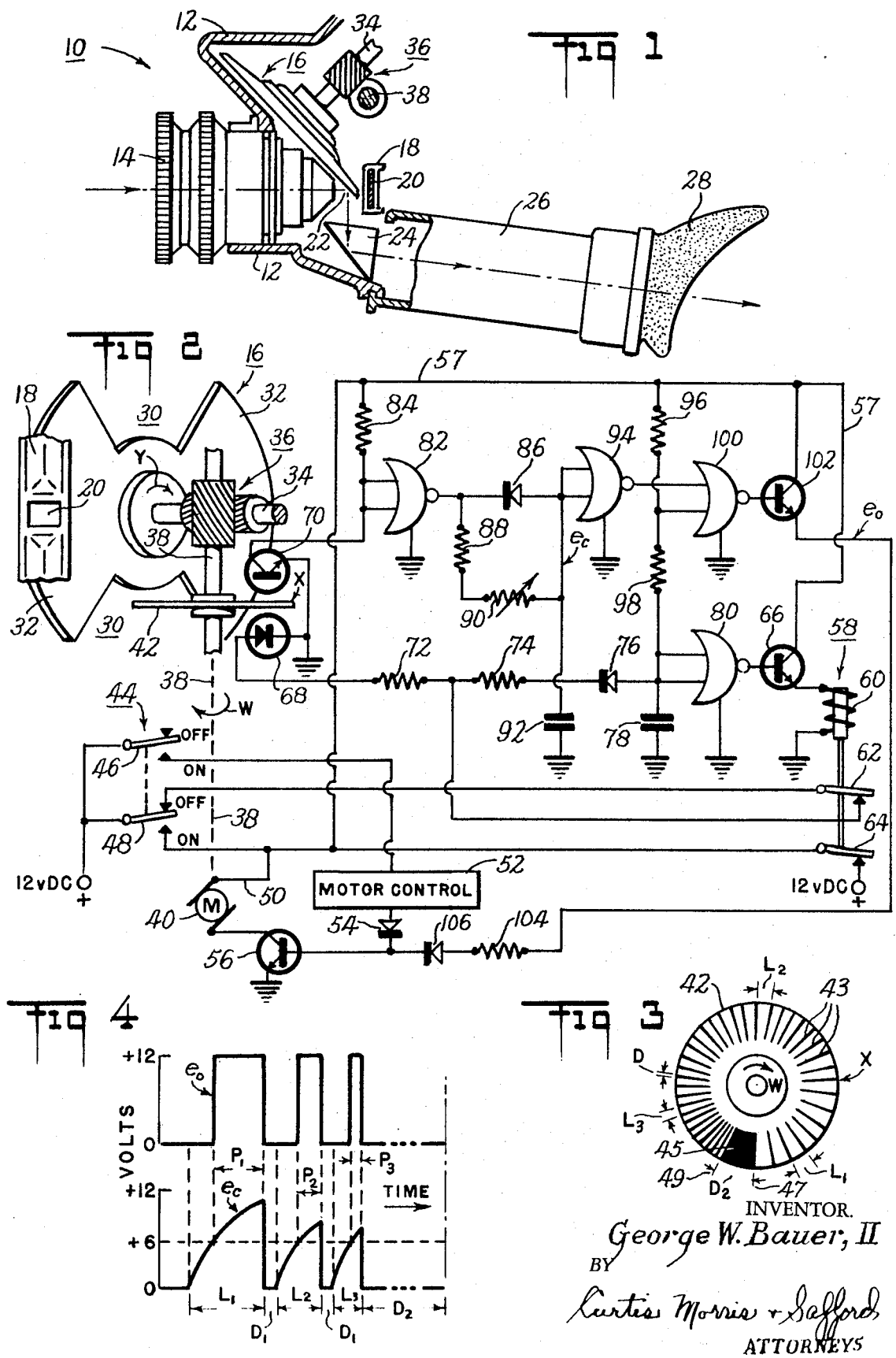

MOTION PICTURE CAMERA MOTOR CONTROL

This invention relates to motor speed control in motion picture cameras, and particularly to means for controlling the speed and stopping of a rotary shutter in a motion picture camera.

In motion picture cameras utilizing rotary shutters, it is desired to stop the rotary shutter in a position in which it prevents images from the camera lens from reaching the film while the camera is inoperative. Furthermore, in such a camera in which the surface of the shutter which intercepts the images is used to reflect the images to an eyepiece to be used by the cameraman for aiming the camera, it is desired that the rotary shutter always be stopped in its reflecting position so that the cameraman can aim the camera in preparation for the next use of the camera.

Accordingly, it is an object of the present invention to provide motion picture motor speed control means, and particularly a device for automatically stopping the rotary shutter of a motion picture camera so that the images from the camera lens are directed to the eyepiece of the camera instead of the film when the camera is not operating. A further object of the present invention is to provide such a device which is compact, light-weight, relatively easy to fabricate, and highly reliable in operation, and which performs with smoothness and rapidity so that its operation is virtually unnoticeable by the operator.

In accordance with the present invention, the foregoing objects have been met by the provision of motion picture camera motor speed control means in which the motor is energized by electrical signals whose energy is a function of the spacing between adjacent indicia on a rotor which is driven by the motor, and of the speed of the rotor. This system is used to stop the camera shutter at a desired location by decreasing the energy of the electrical signals as the shutter rotates in a pre-determined direction. This position preferably is one in which images are prevented from reaching the film, and are instead reflected to the eyepiece of the camera.

Further objects and advantages of the invention will be pointed out in or apparent from the following description and drawings. In the drawings:

FIG. 1 is a partially broken away, partially schematic view of a portion of a camera constructed in accordance with the present invention;

FIG. 2 is a schematic perspective view of the principal components of the control system of the present invention;

FIG. 3 is a plan view of a component of a system shown in FIG. 2; and

FIG. 4 is a graph illustrating certain operational features of the invention.

GENERAL OPERATION

FIG. 1 illustrates a portion of a motion picture camera 10 with a housing 12 and a camera lens 14. A rotary reflective shutter 16 is mounted behind the lens 14. As is shown in FIG. 2, the shutter 16 is a disc with two opposite cut-out sectors 30, with two sectors 32 remaining. A film guide 18 guides motion picture film 20 transversely through the optical path of the lens 14.

When either of the sectors 32 of the shutter 16 is positioned between the lens 14 and the film 20, the images passing through the lens 14 are prevented from reaching the film. However, when the cut-out sectors 30 move into the place of the sectors 32, the images are allowed to reach the film.

The forward surfaces 22 (FIG. 1) of the sectors 32 are made reflective so that when they are positioned in the optical path between the lens 14 and the film 20, the images are reflected downwardly to a reflecting prism 24, and then through a lens system 26 to the eyepiece 28 so that the cameraman can see the images for the purpose of aiming the camera.

Referring now to FIG. 2 as well as FIG. 1, the shutter 16 is mounted on a shaft 34 which is supported by suitable bearings (not shown). The shutter 16 is rotated in the direction indicated by the arrow Y by a DC motor 40 which drives a shaft 38 in the direction indicated by the arrow W. The shaft 38 drives the shaft 34 and the shutter 16 by means of a set of 45° helical gears 36. A shaft position indication disc 42 is secured to the shaft 38. The function of the disc 42 will be discussed in greater detail below.

The electrical system which is shown in FIG. 2 is provided to drive the shutter at a constant speed when the camera is operating, and to automatically stop the shutter in one of its blocking positions; that is, a position in which one of the blocking sectors 32 reflects images to the eyepiece 28 rather than allowing them to reach the film.

The camera in which the present invention is used can be any of a number of well-known motion picture cameras, preferably of professional quality. An example of such a camera is the "Arriflex 16 BL." Preferably, however, the invention is used together with the other advantageous features of the camera shown in the co-pending U.S. patent application of Anton Wilson filed on Oct. 1, 1970 and entitled "Motion Picture Camera." The disclosure of the later patent application hereby is incorporated herein by reference.

CONTROL SYSTEM OPERATION

Referring to FIG. 2, a double-pole, double-throw camera switch 44 is provided. Both contact arms 46 and 48 of the switch 44 are connected to a positive 12 volts DC power supply for the camera. When the switch 44 is turned "ON," 12 volts DC is supplied to one terminal 50 of the motor 40 through the contact arm 48. The same voltage is applied through contact arm 46, a conventional motor control circuit 52, and a diode 54 to the base of a transistor 56 whose emitter-collector path is connected between the other terminal of the motor 40 and ground. The motor control circuit 52 is conventional. For example, it includes a crystal oscillator to provide precise control of the speed of the motor 40.

SHUTTER DECELERATION CONTROL

When the camera switch 44 is switched to the "OFF" position, an automatic deceleration control circuit is used to bring the shutter quickly and smoothly to a stop in the desired location in which one of the blocking portions 32 of the shutter reflects the image to the eyepiece 28 rather than to the film 20.

In principle, the control circuit controls the speed of the motor 40 so as to maintain the speed above a level sufficient to ensure that the shutter will coast all the way to the desired stopping location. Thus, if the motor speed is just right so that the shutter will coast to a stop at the proper location, the control circuit does nothing. However, if the speed is too low during the last revolution of the shutter, the control circuit will give it just enough acceleration to bring it to the proper location.

Part of the deceleration control circuit is the disc 42. Only the edge of the disc 42 is shown in FIG. 2, but the upper surface of the disc is shown in FIG. 3.

Referring to FIG. 3 as well as FIG. 2, the disc 42 has a plurality of opaque, sector-shaped marks 43 (called "lines" herein for the sake of convenience) spaced arcuately around the disc 42. The angular width or thickness D of each opaque line 43 is the same. However, the spacing $L_1$, $L_2$, $L_3$, etc. between adjacent lines 43 decreases gradually as one progresses in a counter-clockwise direction from a starting line 47 to an ending line 49 which is somewhat less than 360° away from line 47. A relatively wide opaque sector 45 is provided between the line 47 and 49.

Referring again to FIG. 2, a light-emitting diode 68 (abbreviated hereinafter "LED") is positioned on one side of the disc 42 and shines light through the transparent portions between the lines 43 of the disc to a phototransistor 70 on the other side of the disc. The LED 68 and the phototransistor 70 are located approximately at the position indicated by the letter X in FIGS. 2 and 3.

The disc 42, the LED 68 and the phototransistor 70 serve two different functions. First, they serve to indicate the position of the shutter 16 during deceleration of the shutter, and also serve as part of a pulse-generating network which is used to control the energy to the drive motor 40 and bring it smoothly to a stop when the opaque region 45 arrives at the point X. The angular position of the disc 42 relative to the shutter 16 is set so that when the disc and shutter are stopped with the portion 45 of the disc 42 at the point X, one of the blocking portions 32 of the shutter will be in the optical path between the lens 14 and the film 20 to reflect instead of transmit images from the lens.

The LED 68 is connected through a resistor 72 to the upper contact of a relay 58. That same contact of relay 58 is connected through a resistor 74 and a diode 76 to the input of an inverting amplifier 80 whose output is connected to the base of a transistor 66.

The contacts of the relay 58 are normally open. Returning for a moment to the condition in which the camera switch 44 still is turned "ON," 12 volts DC is supplied through camera switch contact arm 48 and a lead 57 to the collector of transistor 66 (as well as to other components of the system). At this time, the input to inverting amplifier 80 is at logic zero because there is a very low impedance path between the input of amplifier 80 and ground. This path is through diode 76, resistors 72 and 74, and the LED 68. LED 68 is not energized at this time since no voltage is applied to its anode. Since the input of amplifier 80 is at logic zero, its output is at logic "one," the transistor 66 is turned on, and the coil 60 of the relay 68 is energized so that the contact arms 62 and 64 are forced against their respective contacts.

Now, when the camera switch 34 is turned to the "OFF" position, 12 volts DC still is supplied to lead 57 through the contact arm 64 of relay 58, thus maintaining transistor 66 in a conducting state and "latching" the relay in its energized condition. Simultaneously, 12 volts also is applied through contact arm 48 of switch 44 to the junction between the resistors 72 and 74, thus supplying a bias voltage for energizing the LED 68.

The light emitted by the LED 68 through the transparent regions between lines 43 on the disc 42 are converted into electrical pulses by the phototransistor 70. These pulses are sent to the input of an inverting amplifier 82 which is supplied through a bias resistor 84 from the line 57. The amplifier 82 serves mainly as a pulse-shaping circuit to provide a clean rectangular wave output pulse.

The output of amplifier 82 is sent to a circuit including a diode 86 connected in parallel with a resistor 88 which is connected in series with a variable resistor 90. This parallel combination is connected to the upper terminal of a capacitor 92 whose lower terminal is grounded and also is connected to the input of another inverting amplifier 94.

When light from the LED 68 falls on the phototransistor 70, the input to gate 82 falls to zero and its output rises from zero to 12 volts. The capacitor 92 starts charging to this voltage through the resistors 88 and 90. Amplifier 94 is an inverting level-detector gate which switches logic states when its input voltage reaches approximately 6 volts. Thus, when the charge on the capacitor 92 reaches approximately 6 volts, the output of gate 94 goes from logic "one" to logic "zero." The output of this gate is sent to one input lead of a NOR circuit 100 whose output is connected to the base of a transistor 102 whose output voltage is $e_o$. The voltage $e_o$ is supplied to the motor control transistor 56 through a current-limiting resistor 104 and a diode 106. The output of gate 100 will switch from logic "zero" to logic "one" if and only if the voltage at its second input 97 is below 6 volts.

When the output of gate 100 switches, the transistor 102 turns on and turns on transistor 56, thus supplying approximately 12 volts DC to the motor 40.

When an opaque line 43 once again blocks the light from reaching the phototransistor 70, the input voltage to the gate 82 suddenly goes high, and its output goes to zero. This causes the capacitor 92 to discharge rapidly through the diode 86 and the ground connection provided by the gate 82 when it is in its logic "zero" condition. Thus, the input voltage to gate 94 drops suddenly to zero and the output of gate 94 does high. This turns off the gate 100 and the transistors 102 and 56, thus de-energizing the motor 40. The energy pulse thus delivered to the motor 40 accelerates the motor by an amount sufficient to ensure that the disc 42 will reach the next transparent region, except in the case when the end line 49 terminates the pulse to the motor.

For the purposes of the following explanation, assume that the speed of the disc 42 remains constant. When the next transparent region again appears, allowing light to again reach phototransistor 70 from the LED 68, a 12 volt pulse to the motor 40 again is initiated, as before. However, since the spacing between adjacent opaque lines 43 has decreased, the time duration of the resulting voltage pulse to motor 40 would decrease, with the result that the energy delivered by the pulse also decreases. However, the speed of the motor and disc actually decrease. Therefore, the time duration of the pulse to motor 40 is increased so that this next pulse is roughly the same in energy as was the previous pulse. The energy delivered to the motor thus is maintained at a level sufficient to ensure that the deceleration of the motor is not so great that the disc 42 stops short of the desired location.

The foregoing procedure is repeated, with the pulses continuing to be delivered to the motor 40 as the end point 49 on the disc approaches the point X marking the location of the LED 68 and the phototransistor 70. When this point is reached, the shutter and its motor 40 have slowed down very considerably. As the opaque section 45 passes between the LED and the phototransistor, no pulses can be delivered to the motor 40. The dimensions of the portion 45 are such that, when the speed, inertia, bearing friction, etc. of the motor 40, the shutter 16, and the disc 42 are taken into consideration, the motor and shutter will usually coast to a stop within the distance between points 49 and 47. Thus, the shutter 16 will stop with one of its blocking portions 42 in proper position to reflect instead of transmit images from the lens 14.

The foregoing operation is illustrated by the graph of FIG. 4, in which the output voltage $e_o$ to the motor 40 and the charging voltage $e_c$ of the capacitor 92 are plotted against time. FIG. 4 illustrates the condition in which, when the point 47 passes the point X, the speed of the disc 42 is so low that it would coast to a stop long before the shutter reaches the desired position. That is, FIG. 4 illustrates the condition in which the shutter enters its last revolution without enough speed to coast to the desired position.

In FIG. 4, the times $L_1$, $L_2$ and $L_3$ are the times between opaque lines 43 relatively shortly after the starting point 47, midway around the disc, and near the end line 49 on the disc, respectively, as is indicated by the corresponding distances $L_1$, $L_2$ and $L_3$ in FIG. 3. The times $D_1$ in FIG. 4 represent the times taken by the lines 43 to pass the point X. Although the angular width D of each of the sectors or "lines" 43 is the same, the time $D_1$ will not usually be constant because the disc slows down considerably during its rotation through one revolution. However, the variation of $D_1$ is relatively insignificant. It can be seen from FIG. 4 that the time periods $P_1$, $P_2$ and $P_3$ of the respective output pulses $e_o$ are progressively shorter and thus contain pregressively less energy as the disc rotates further.

The times $L_1$, $L_2$ and $L_3$, and the pulse durations $P_1$, $P_2$ and $P_3$, as shown in FIG. 4, illustrate only the effects of the variable spacing between the lines 43 on the disc 42. Not illustrated is the negative feed-back effect created by the fact that these time periods depend not only upon the spacing between adjacent lines 43 on the disc 42, but also upon the speed of the disc. Thus, if the speed of the disc 42 increases, the time period L between adjacent lines and the duration P of the resulting pulse decreases so as to decrease the energy delivered to the motor 40 and allow it to slow somewhat. With a decrease in the speed of the disc 42, the next time periods L and P will increase, thus increasing the energy to the motor and accelerating it somewhat. Thus, the speed of the disc and shutter are regulated to a value determined by the spacing of the lines 43 and the time constant TC of the circuit consisting of resistors 88 and 90 and the capacitor 92.

The disc 42 and motor 40 may not always come to a stop within 1 revolution of disc 42. In fact, most camera motors now in use will not coast to a stop in only one revolution, and usually require 4 to 10 revolutions in which to stop. In accordance with another advantageous feature of the invention, the spacing between lines 43 and the time constant TC are set at values such that the voltage $e_c$ never reaches the 6 volt level necessary to fire gate 94, with the result that no pulses at all are developed, until the last revolution of the disc 42. Then, during that last revolution, if the speed of the disc is too low to bring it to the proper rest position, the operation of the circuit as shown in FIG. 4 will take place. The time constant TC can be adjusted by merely adjusting the variable resistor 90. This will vary the slope of the leading edges of the voltage pulses $e_c$ shown in FIG. 4. If the resistance of the resistor 90 is increased, the time constant for charging the capacitor 92 will be increased, and the pulses $e_o$ will be of shorter duration and will contain less energy, or will be nonexistent. On the other hand, if the resistance of resistor 90 is decreased, the time constant for charging the capacitor 92 will decrease and the pulses $e_o$ will have a longer time duration and will contain more energy.

AUTOMATIC TURN-OFF

From approximately 1 to 10 seconds after the camera switch 44 has been turned "OFF," the circuit shown in FIG. 2 operates automatically to de-energize the relay 58 and completely deactivate the motor 40 and the circuit shown in FIG. 2.

When the camera switch 44 initially is turned "OFF", the voltage supplied to the junction between the resistors 72 and 74 back-biases the diode 76 so that the capacitor 78 connected to the input of the gate 80 can start receiving charging current from the line 57 through the resistors 96 and 98. When the voltage at the input of gate 80 has charged up to 6 volts, the output of gate 80 returns to logic zero, and the transistor 66 turns off. This de-energizes the coil 60 to relay 58 and causes the contact arms 62 and 64 to return to their normally open positions. This removes the voltage from the junction between resistors 72 and 74, and de-energizes the light-emitting diode 68. It also should be remembered that, should the gate 100 still be operating, the appearance of 6 volts on its lead 97 also will turn off gate 100. This provides added safety.

The capacitor 78 now is free to discharge through the low-impedance path through diode 76, the resistor 72 and 74 and the LED 68, and the control circuit is ready again for further operation. The time constant of the circuit including resistors 96 and 98 and the capacitor 78 determines the time it takes for the circuit to automatically turn itself off. As has been noted above, this time typically varies between approximately 1 and 10 seconds.

It is preferred that the LED 68 emit infrared radiation rather than visible light radiation. By using such an infrared LED, shielding need not be used to prevent the film in the camera from being exposed by leakage from the LED. The phototransistor 70 should be responsive in the infrared range of the spectrum. The light from the LED is focused by an integral lens in the LED, and is limited to a fine, linear beam by means of a mask (not shown) with a fine slit. The term "light," as used herein, includes electromagnetic radiation throughout the spectrum, and, therefore, includes both visible and infrared radiation.

The foregoing system has been built and successfully operated using the following electrical components:

| Component | Value or identification |
| --- | --- |
| Resistor 90 | 1 megohm potentiometer |
| Resistor 88 | 47,000 ohms |
| Resistor 98 | 1.5 megohms |
| Resistor 96 | 4.7 megohms |
| Resistor 104 | 1,000 ohms |
| Resistor 84 | 100,000 ohms |
| Resistor 72 | 330 ohms, ½ watt |
| Resistor 74 | 10,000 ohms |
| Diodes 76, 86 and 106 | |
| Capacitor 92 | .015 microfarads |
| Capacitor 78 | 1.5 microfarads |
| Transistors 102 and 66 | 2N4301 NPN transistors sold by Motorola. |
| Gates 80, 82, 94 and 100 | High threshold integrated NOR gates, e.g. the CD 4001 level-detecting complimentary MOS integrated circuit gate, manufactured by RCA. |
| LED 68 | The SSL-315 light-emitting diode with output peaked in the infrared. Has integral lens. Made by G. E. |
| Phototransistor 70 | TIL 612, made by Texas Instruments. Response is peaked in the infrared. Has integral lens. |

The above-described speed control system can be used to maintain the motor speed constant, as well as to control the speed in a deceleration mode of operation, by simply making the spaces between the indicia 43 equal instead of decreasing magnitude, and by eliminating the opaque region 45 on the disc 42. This control arrangement can be quite useful as a simple device in controlling the speed of camera motors such as those used in driving the "zoom" lens in the camera. The speed can be varied over a wide range simply by varying the setting of the time constant TC in the manner described above.

It should be made abudently clear that various other modifications can be made in the specific structures disclosed herein without departing from the spirit and scope of the invention. For example, it should be clear that the disc 42 need not have the specific configuration shown and described herein. In place of the optical disc and detector described, there can be used a disc in which conductive and non-conductive segments replace the opaque lines 43 and the transparent spaces between them. A brush and electrical circuit connected to it could be used to detect the presence of the conductive and non-conductive segments as the disc rotates.

It also should be apparent that the indicia such as opaque marks 43 or conductive segments need not appear on a separate rotor such as the disc 42 but, instead, can be formed integrally with the shutter 16 itself. For example, if there is room in the vicinity of the hub of the shutter 16, the indicia can advantageously be placed directly on the hub so as to maximize accuracy of location, and minimize weight, bulk and manufacturing expense.

In any event, the system described herein not only is accurate, but it is relatively simple in construction and relatively trouble-free.

I claim:

1. In a motion picture camera having a rotary shutter and drive means for rotating said shutter, shutter drive control means including means for delivering to said drive means electrical energy in an amount sufficient to prevent said shutter from stopping before it reaches a pre-determined rotational position, and for decreasing said energy substantially to zero when said shutter reaches said pre-determined rotational position so as to stop said shutter adjacent said position, said control means including a rotor with indicia spaced therearound, the spacing between said indicia decreasing progressively around said rotor, means for coupling said rotor to said shutter for rotation therewith, means for detecting said indicia as said rotor rotates and controlling said energy in accordance with the time between the passage of adjacent ones of said indicia past said detecting means.

2. Apparatus as in claim 1 in which said shutter has at least one blocking portion which, when in an operative position, prevents images from reaching the film in said camera, and in which said energy decreases to zero when said blocking portion reaches said operative position.

3. Apparatus as in claim 1 in which said shutter has at least one blocking portion which, when in an operative position, prevents images from reaching the film in said camera, and in which said blocking portion reflects said images back to the eyepiece of said camera when said blocking portion is in said operative position.

4. A motion picture camera including a camera lens, a rotary reflective shutter, a film guide, a motor for driving said shutter, and control means for stopping said shutter in a reflective position, said control means including pulse generator means for selectively delivering to said motor electrical pulses each of whose energy varies directly with the angular distance of a first point on said shutter from a reference location, inversely with the speed of said shutter, and decreases substantially to zero when said shutter is adjacent said reflective position.

5. A camera as in claim 4 including means for starting said pulse generator when said shutter reaches a first rotational position, and means for stopping said pulse generator when said shutter reaches a second rotational position at which said first point has reached said reference location and said shutter is adjacent said reflective position.

6. A camera as in claim 5 in which said pulse generator includes a rotor which rotates with said shutter, said rotor having arcuately spaced linear indicia thereon, the spacing between said indicia decreasing between a first line corresponding to said first rotational position of said shutter and a second line corresponding to said second rotational position of said shutter, and a detector positioned to detect said indicia and produce said pulses in response thereto.

7. A camera as in claim 6 including charge storage means for storing charge to develop pulses in the time intervals between passage of adjacent ones of said indicia past said source and said detector.

8. In a motion picture camera having a rotary shutter, a drive motor for rotating said shutter, shutter drive control means including a rotor coupled to rotate with said shutter, said rotor having indicia angularly spaced thereon, means for detecting said indicia and producing electrical pulses in response to the detection of said indicia, said indicia being spaced progressively closer together around said rotor in a predetermined direction, means for energizing said motor with said pulses, and means for substantially stopping said pulses when said rotor is near a pre-determined position in which said shutter prevents images from reaching the film in said camera.

9. Apparatus as in claim 8 in which said indicia are opaque regions with transparent regions between said opaque regions on said rotor, said detecting means including a radiation source and a radiation-responsive detector device positioned to receive radiation from said source through said transparent regions.

10. Apparatus as in claim 9 in which said radiation source is a light-emitting diode and said radiation-responsive detector device is a phototransistor.

11. Apparatus as in claim 9 in which the angular extent of said transparent regions between said opaque regions decreases to zero from an initial value at a starting position when said rotor rotates in said predetermined direction past said source and detector device, and electrical charge storage means operated by said detector device for developing said pulses, the amount of energy in each pulse being determined by the charge stored in said storage means.

12. Apparatus as in claim 11 including on said rotor an opaque region of relatively great angular extent between said starting position and the position at which the angular extent of the transparent spaces drops to zero.

13. A device as in claim 8 including means for setting a minimum motor speed above which said electrical pulses are not produced.

14. A device as in claim 13 in which the detecting means includes charge storage means for storing charge between adjacent ones of said indicia, and level detector means for detecting the level of charge on said storage means and starting one of said electrical pulses when the charge reaches a pre-determined level.

* * * * *